May 25, 1937.   J. H. HOWARD ET AL   2,081,201
CORE DRILL HEAD
Filed May 25, 1934   2 Sheets-Sheet 2

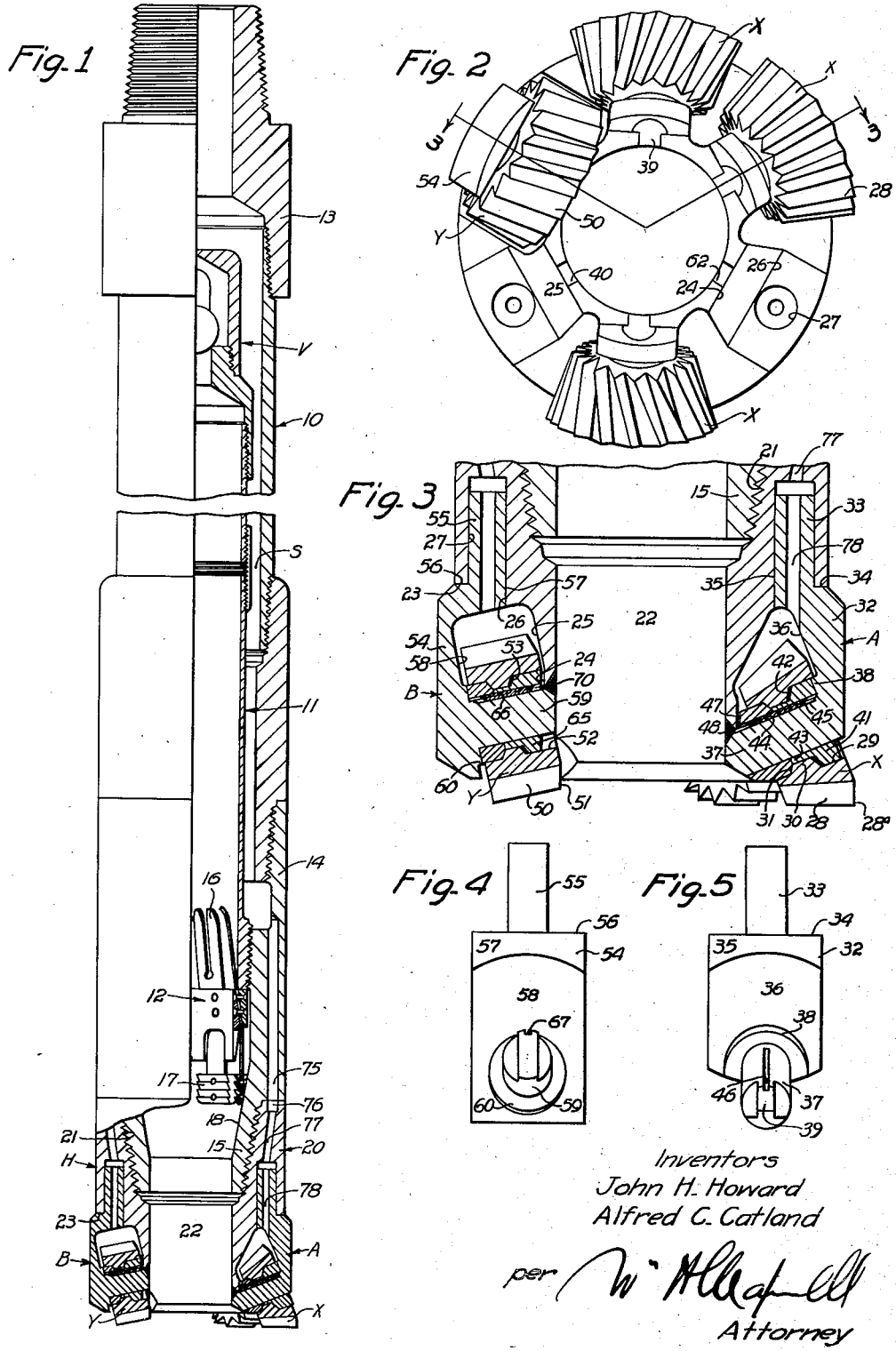

Inventors
John H. Howard
Alfred C. Catland per
Attorney

Patented May 25, 1937

2,081,201

UNITED STATES PATENT OFFICE 2,081,201

CORE DRILL HEAD

John H. Howard, Huntington Park, and Alfred C. Catland, Alhambra, Calif., assignors to Globe Oil Tools Company, Los Nietos, Calif., a corporation of California Application May 25, 1934, Serial No. 727,500

11 Claims. (Cl. 255—72)

This invention relates to a well drilling tool and relates more particularly to a bit head or cutter head for a core drill. A general object of this invention is to provide a simple, practical and improved core drill head.

Another object of the invention is to provide a core drill head embodying a plurality of roller cutters mounted in a manner so that they may be easily and quickly replaced.

Another object of the invention is to provide a core drill head embodying detachable cutter carrying units rigidly and dependably attached to the body of the head by small sections of welding and fitted on the head so that the welding is not subjected to breaking forces during the drilling operations.

Another object of the invention is to provide a core drill head of the character mentioned in which the roller cutters are rotatably mounted on the units and the units are detachably connected to the body of the head without employing screw threads.

Another object of the invention is to provide a core drill head embodying a plurality of cutter carriers that may be easily detached from the head to permit the replacement of the cutters and their bushings and then easily and quickly reapplied to the head carrying new or replacement cutters and bushings.

Another object of the invention is to provide a core drill head of the character mentioned in which the detachable units each have a cutter carrying pin having one end integrally connected to the unit and one end directly bearing on the body of the head.

A further object of the invention is to provide a core drill head of the character mentioned that is economical in construction and maintenance and that carries or supports its cutters in advantageous positions making the drill rapid and efficient in operation.

Figure 6:
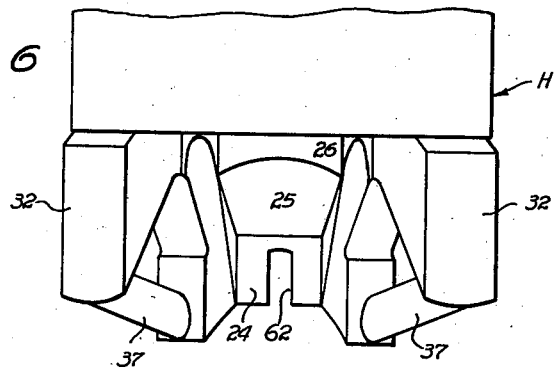
Figure 7:
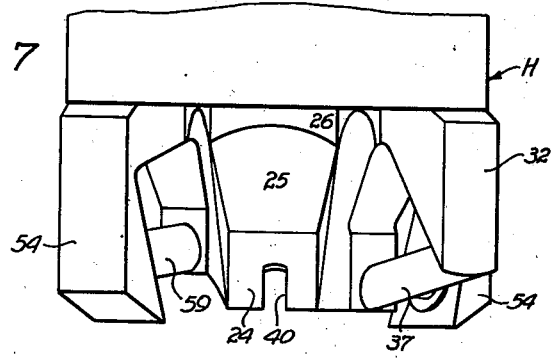
Figure 8:
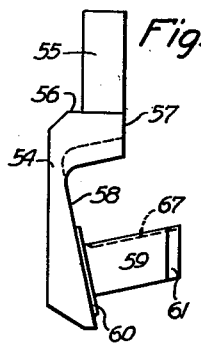
Figure 9:
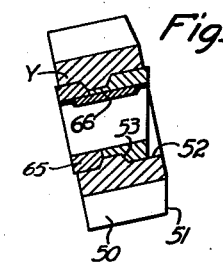
Figure 10:
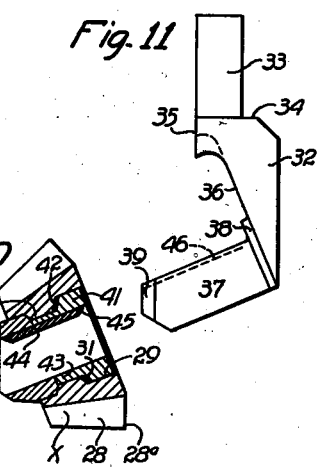
Figure 11:
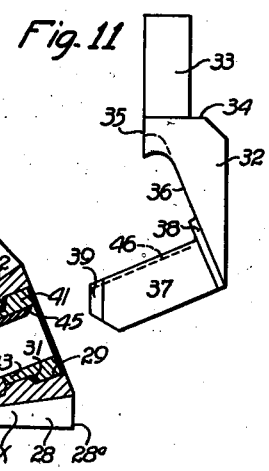

Other objects and features of the invention will be better and more fully understood from the following detailed description of a typical form and application of the invention, throughout which description reference may be had to the accompanying drawings, in which:

Fig. 1 is a side elevation of a core drill with one quarter in longitudinal cross section and carrying the head of the present invention which appears in longitudinal cross section. Fig. 2 is an enlarged bottom view of the head with two of the cutter carrying units removed. Fig. 3 is a longitudinal detailed sectional view of the head taken substantially as indicated by line 3—3 on Fig. 2. Fig. 4 is an elevational view of the inner side of one of the carriers for supporting an inner cutter. Fig. 5 is an elevational view of the inner side of one of the carriers for supporting an outer cutter. Fig. 6 is a side elevation of the head with one of the inner cutter carriers removed and with the cutters and bearings removed from the other carriers. Fig. 7 is a view similar to Fig. 6 taken at a different rotative position with one of the outer cutter carriers removed and with the cutters and bushings removed from the other carriers. Fig. 8 is a side elevation of the carrier of one of the inner cutter carrying units. Fig. 9 is a longitudinal detailed sectional view of one of the inner cutters and its bushing. Fig. 10 is a longitudinal detailed sectional view of one of the outer cutters and its bushing and Fig. 11 is a side elevation of the carrier of one of the outer cutter carrying units.

The present invention is concerned primarily with an improved bit head or cutter head for a core drill. To facilitate a clear understanding of the invention the head will be described in connection with a more or less typical core drill assembly, it being understood that the invention is not to be construed as limited or restricted to the specific form or application about to be described, but is to be taken as including any features or modifications that may fall within the scope of the claims.

The core drill illustrated in the drawings includes an outer barrel 10, an inner barrel 11, a core catcher 12, and the cutter head or bit head H of the present invention. The outer barrel 10 is an elongate tubular structure having a sub 13 at its upper end for connection with the drilling string. A connecting member or sub 14 is provided on the lower end of the outer barrel and has a screw threaded pin 15 for carrying or connecting with the head H. The inner barrel 11 is provided to receive the core cut by the bit head and is arranged longitudinally in the outer barrel 10. In accordance with the usual practice an annular space S is provided between the interior of the outer barrel 10 and the inner barrel 11. The lower end of the inner barrel 11 is screwthreaded in the connecting member 14. A suitable valve V is provided on the upper end of the inner barrel 11 to permit the escape of trapped fluid from the inner barrel and to prevent the downwardly flowing circulation fluid from entering the inner barrel. The core catcher 12 is arranged in the connecting member 14 at the lower end of the inner barrel 11 and is operable to grip and support the core when the drill is raised and removed from the well. The core catcher 12 embodies an annular body carrying longitudinally disposed spring members 16. Slips 17 are provided on the lower ends of the members 16 and are adapted to cooperate with the inclined walls of the opening 18 upon upward movement of the drill to grip the core.

The cutter head or bit head H of the present invention includes, generally, a tubular body 20 on the lower end of the connecting member 14, one or more detachable units A on the body embodying cutters X, and one or more detachable units B on the body 20 embodying cutters Y.

The bit head body 20 is attached to the sub 14 at the lower end of the outer barrel and carries the cutter units A and B whereby the drill is operatable to make an annular cut and form a core to be received in the inner barrel 11. In the preferred construction the body 20 is integral and is annular or tubular in its general configuration. A screw-threaded socket 21 is provided in the upper end of the body 20 to receive and cooperate with the pin 15. A central longitudinal opening 22 is provided in the head 20 to receive or pass the core. A downwardly facing external annular shoulder 23 is provided on the body 20 between its ends.

The portion of the body 20 below the shoulder 23 is shaped to receive or carry the units A and B. This lower portion of the body 20 is reduced in external diameter and is provided with vertically or longitudinally extending series of faces. Each series of faces or surfaces includes a lower substantially vertical face 24 extending upwardly from the lower end of the body. An upwardly and outwardly inclined face 25 extends upwardly from each face 24. A flat vertical face 26 extends from the upper end of each face 25 to the downwardly facing shoulder 23. The faces 25 which oppose the units A are pitched outwardly at a greater angle than the corresponding faces opposing the units B. The flat vertical faces 24 and 26 are preferably tangent to circles concentric with the longitudinal axis of the tool. In accordance with the invention an opening or socket 27 extends upwardly in the body 20 from the shoulder 23 at the upper end of each series of faces 24, 25 and 26. The sockets 27 extend parallel with the longitudinal axis of the body 20 and their axes are equally spaced between the opposite vertical edges of the faces 26. The sockets 27 may be round in cross section.

The detachable units A embody the cutters X which are provided to engage the outer portion of the bottom of the well bore and the side wall of the well bore to ream or cut the bore to size. The cutters X are frustro-conical roller cutters having flat normal ends and pitched or inclined peripheries. Peripheral cutting parts or teeth 28 are provided on the cutters X. In the particular form of the invention disclosed in the drawings there are four units A each carrying a cutter X. The units A are arranged or positioned in pairs at diametrically opposite portions of the body 20. The teeth 28 of one cutter of each pair are straight or axial while the teeth of the other cutters are spiralled. The spiral teeth of one cutter are pitched in one direction while the spiralled teeth of the other cutter are spiralled or pitched in the opposite direction.

In accordance with the invention the outer cutters X are supported by the units A to rotate about axes inclined downwardly and inwardly, as will be more fully described, so that their cutting teeth 28 which project from the lower end of the body 20 are substantially normal to the longitudinal axes of the tool as they come into engagement with the earth formation. The cutters X project from the periphery of the body and the outer ends of their cutting teeth 28 are bevelled to have reaming edges 28$^a$. Each outer cutter X has a central longitudinal opening 29 provided between its ends with an annular restriction or flange 30. The opposite ends of the flanges 30 are inclined and constitute oppositely facing annular thrust shoulders 31 in the cutter openings.

Each detachable unit A embodies a wing support or carrier 32 for carrying a cutter X. The cutter carriers 32 are preferably integral members and are alike in size and configuration. Each carrier 32 includes a stem 33 projecting from its upper end to fit a socket 27. An upwardly facing shoulder 34 is provided at the lower end of the stem 33 and is adapted to seat upwardly against the body shoulder 23. A flat vertical face is provided on the inner side of each carrier 32 at the base of its stem 33. The faces 35 cooperate with the body faces 26 to position the carriers and to prevent turning or swinging of the carriers. The inner sides 36 of the carriers 32 are inclined downwardly and outwardly. In the preferred construction the carriers 32 project outwardly beyond the periphery of the body 20 and their outer sides are cylindrically curved about the central axis of the head.

Each carrier 32 has a stud or pin 37 projecting from its inner side to carry a cutter X. The pins 37 are preferably integral with carriers 32 and project downwardly and inwardly from the lower end portions of the carriers. Bosses 38 are provided at the bases of the pins 37 to space the cutters X from the carriers and to strengthen the carriers. It is a feature of the invention that the inner ends of the pins 37 directly engage or cooperate with the body 20 of the head. A vertical rib or lug 39 is provided on the inner end of each pin 37 and cooperates with a slot 40 in the inner wall of the body 20. The upper ends of the lugs 39 may bear upwardly against the upper ends of the slots 40. The lugs 39 cooperate with the slots 40 to directly transmit torque and upward thrusts from the inner ends of the pins 37 to the body 20. The slots 40 are initially open at the lower end of the head permitting the easy insertion of the lugs. The ends of the lugs 39 are flush with the wall of the opening 22 while the lower corner portions of the pins 37 are preferably flush with the bevelled end part of the body 20.

Bearing means is provided for rotatably supporting the cutters X on the pins 37. Bushing sections 41 are arranged in the opposite ends of the cutter openings 29 and have ends or shoulders 42 cooperating with the shoulders 31. The shoulders 42 directly receive end thrusts from the cutters X. A reduced extension 43 is provided on one of the bushing sections to extend through the flange 30 and engage the end of the other bushing section. The bushing sections have aligned grooves or key-ways receiving splines, or feather keys 44. The end portions of the keys 44 are welded to the bushing sections at 45 whereby the keys operate to connect the two sections of each bushing. Keyways 46 are provided in the pins 37 to receive the splines or feather keys 44. The keys 44 hold the bushings against turning on the pins 37. The upper or outer ends of the bushings cooperate with the bosses 38 to space the outer ends of the cutters X from the inner sides 36 of the carriers. The inner or lower ends 47 of the bushing assemblies 41 are oblique or inclined to cooperate with the vertical surfaces 24 of the body 20. With the assembly of the bushings 41 and cutter X on the pin 37 of a carrier 32 the carrier may be moved upwardly or parallel with the longitudinal axis of the head to enter its stem 33 in a socket 27 and to bring its shoulder 34 against the body shoulder 23. The lug 39 enters the slot 40 and the oblique end 47 of the bushing clears or slidably engages the body surface 24.

With the carrier in this position the lug 39 is welded to the inner wall of the head 20 at 48 to attach the carrier to the head. It will be apparent how the several carriers 32 carrying the cutters X and bushing assemblies may be readily mounted on the body 20 in the manner just described. The lugs 39 cooperate with the slots 40 to transmit turning forces and thrusts from the ends of the pins 37 directly to the body 20 so that the welding 48 is not subjected to any breaking strains. The welding 48 merely operates to retain the carriers in the positions where their surfaces 34 and 35 cooperate with the body surfaces 23 and 26. The carriers are fitted to or arranged on the body 20 so that they are dependably supported against the strains and thrusts to which they are subjected during the use of the drill.

The units B are spaced between the pairs of units A, there being two diametrically opposite units B in the assembly illustrated. The units B embody the inner cutters Y for engaging the inner portion of the bottom of the well bore and for trimming the core. The cutters Y are substantially cylindrical roller cutters having flat normal ends and peripheral cutting teeth 50. The cutting teeth 50 are preferably spiralled and the teeth of the two cutters Y may be spiralled in opposite directions. The inner peripheral corners 51 of the teeth 50 may be bevelled off to properly trim the core for passage through the opening 22. Each cutter Y has a central longitudinal opening 52 having an annular restriction or flange whose ends form oppositely facing thrust shoulders 53.

Each unit B includes or embodies a carrier 54. The carriers 54 are similar, generally, to the carriers 32 but support the cutters Y for rotation about axes inclined downwardly and outwardly. Each carrier 54 has an upstanding stem 55 on its upper end for fitting a socket 27. Upwardly facing shoulders 56 occur at the lower ends of the stems 55 for fitting or bearing upwardly against the body shoulder 23. Flat vertical faces 57 are provided on the inner sides of the carriers 54 adjacent the shoulders 56 for bearing inwardly against the body surfaces 26. The inner sides 58 of the carriers 54 are inclined downwardly and inwardly while the outer sides of the carriers which project from the head may be cylindrically curved about the central longitudinal axis of the head. Studs or pins 59 project upwardly and inwardly from the inner sides 58 of the carriers. Bosses 60 are provided on the inner sides of the carriers to surround the inner ends of the pins. The pins are preferably integral with the carriers and their inner ends have direct bearing engagement with the body 20 of the head. Ribs or lugs 61 are provided on the inner ends of the pins 59 to cooperate with slots 62 in the inner wall of the body 20. The lugs 61 cooperate with the slots 62 to transmit torque and thrusts from the pin 59 to the body 20.

Means is provided for rotatably supporting the cutters Y on the pins 59. Bushing sections 65 are arranged in the opposite ends of the cutter openings 52 to have their inner ends cooperate with the thrust shoulders 53. Due to this cooperation the end thrusts are transmitted directly from the cutters Y to the bushing 65. Splines or feather keys 66 seat in keyways or grooves in the bushings and have their opposite ends welded to the bushing sections to join or connect the two bushing sections of each cutter. The outer ends of the bushings 65 cooperate with the bosses 60 to space the cutters Y from the inner sides 58 of the carriers. The inner ends of the bushings 65 are pitched or inclined to clear or slidably engage the vertical faces 24 of the body. Keyways 67 are provided in the pins 59 to receive the keys 66 of the bushing assemblies whereby the keys 66 hold the bushing assemblies against rotation.

When the cutters Y and their bushings 65 have been assembled on the pins 59 the carriers 54 are moved longitudinally or upwardly to cause the stems 55 to enter the sockets 27, the lugs 61 to enter the slots 62, and to bring the shoulders 56 into engagement with the body shoulder 23. The oblique or inclined ends of the bushings 65 allow the carriers to be arranged or positioned in this manner. The faces 57 bear against the body faces 26 to position the carriers and support them against inward thrusts. After the carriers have been set or positioned the lugs 61 are welded to the inner wall of the body 20 at 70. The welding 70 is not subjected to any appreciable strains or breaking forces due to the cooperation of the lugs 61 with the slots 62 and the cooperation of the carrier surfaces with the body shoulders and surfaces. The cutters Y rotatably supported on the downwardly and outwardly inclined pins 59 through the bushings 65 project from the lower end of the body 20 to engage the formation at the bottom of the well bore and project slightly into the opening 22 to trim the core to pass into the drill with suitable clearance.

Means is provided for washing or flushing the cutters X and Y. Longitudinal ports 75 are provided in the wall of the connecting member 14 and extend from the lower end of the space S to an annular groove 76 in the upper end of the body 20. Ports 77 extend from the groove 76 to the upper ends of the sockets 27. Passages 78 extend downwardly through the stems 33 and 55 to discharge the circulation fluid downwardly immediately above the cutters X and Y. The circulation fluid pumped downwardly through the drilling string passes from the space S through the ports 75 to the groove 76 where it is distributed to the ports 77. The passages 78 in the carriers direct the fluid downwardly against the cutters to effectively flush their cutting parts or teeth and to maintain the proper circulation in the well bore.

It is believed that the operation of the core drill head provided by this invention will be readily apparent from the foregoing detailed description. The positioning of the several cutters X and Y makes the drill rapid and efficient in operation. The cutters X operate to cut the well bore to size and act on the major outer portion of the bottom of the bore. The inner cutters Y rotating about downwardly and outwardly inclined axes trim the core and engage the inner portion of the bottom of the bore. The core cut by the cutters is received in the inner barrel 11 and recovered in the usual manner by the core catcher 12. During the drilling operation the cutters X and Y are dependably rotatably supported on their respective pins 37 and 59 through the sectional bushing assemblies.

The carriers 32 and 54 are firmly and rigidly attached to the body 20 in manners so that the welds 48 and 70 are not subjected to failure. The shoulders 34 and 56 cooperate with the body shoulder 23 to transmit upward thrusts from the carriers to the body while the lugs 39 and 61 cooperate with the slots 40 and 62 to transmit torque and thrusts from the inner ends of the cutter carrying pins directly to the body. When the cutters and/or their bushings become worn and it is desired to replace them the welds 48 and 70 are burned or cut away to allow the carriers 32 and 54 to be slid free of the body 20. After disconnection of the carriers from the body 20 the assemblies of the cutters X and Y and their bushings may be slid or removed from the pins of the carriers. When new or replacement bushings and cutters have been arranged on the pins the carriers may be re-attached to the body 20 in the manner described above whereupon the drill is again ready for use. The cutters X and Y and the bushing assemblies carrying the cutters may be easily and quickly replaced in any shop provided with welding equipment. Welding equipment is all that is required in the replacing of the cutters and bushings.

Having described only a typical form and application of our invention, we do not wish to be limited or restricted to the specific form and application herein described, but wish it to be considered as including any variations or modifications that may appear to those skilled in the art or fall within the scope of the following claims:

Having described our invention, we claim:

1. A well drill including a barrel, a tubular bit head body rigidly attached to the lower end of the barrel to form a continuation thereof and having a downwardly facing shoulder, there being a socket in the body extending upwardly from the shoulder, a carrier projecting downwardly in spaced relation to the side wall of the body and having its upper end bearing upwardly against said shoulder, a stem integral with the carrier extending into the socket, a cutter carrying pin on the carrier projecting inwardly from the carrier, and means attaching the inner end portion of the pin to the said side wall of the body.

2. In a well drill, a head having a slot in its lower end, a removable carrier on the head, the carrier including an inwardly projecting pin, a flat sided projection on the pin held in the slot in the head to attach the carrier to the head, and a rotatable cutter on the pin.

3. In a well drill, a head having a shoulder and a slot, a detachable carrier having a face bearing on the shoulder, a pin projecting from the carrier, a rotatable cutter on the pin, and a lug on the pin cooperating with the slot to transmit thrusts to the head.

4. In a well drill, a head having a shoulder and a slot, a detachable carrier having a face bearing on the shoulder, a pin projecting from the carrier, a rotatable cutter on the pin, a lug on the end of the pin cooperating with the slot, and a weld connecting the lug and head.

5. In a well tool, a rigid head whose lower portion is of reduced external diameter whereby it has a downwardly facing shoulder and a reduced external surface, a detachable carrier having an upwardly facing shoulder bearing upwardly against the shoulder of the head and having a face bearing inwardly against said surface of the head, a pin projecting inwardly from the carrier, a rotatable cutter on the pin, and means connecting the inner end of the pin with the inner wall portion of the head to hold the carrier in position on the head.

6. In a well tool, a head having a downwardly facing shoulder and an external surface and having a slot in its lower end, a detachable carrier bearing upwardly against the shoulder of the head and having a face bearing inwardly against said surface of the head, a pin projecting inwardly from the carrier, a rotatable cutter on the pin, means removably connecting the inner end of the pin to the head to transmit torque thereto, said means including a rib on the pin cooperating with the slot, and a weld at the said rib and slot holding the carrier on the head.

7. In a well tool, a barrel adapted to be attached to a drilling string, a tubular head rigidly connected to the lower end of the barrel to form a continuation thereof, the head having spaced sockets, spaced slots in its lower end and downwardly facing shoulders at the mouths of the sockets, carriers arranged on the head to have their upper ends bear upwardly on said shoulders, stems rigid with the carriers extending into the sockets, pins projecting inwardly from the carriers and cooperating with the head to transmit thrusts thereto, certain of the pins being inclined downwardly and inwardly and others being inclined downwardly and outwardly, cutters rotatable on the pins, and means connecting the inner ends of the pins to the head including lugs on the pins cooperating with the slots.

8. A head for a well drill including, a tubular body having a slot in its lower end and a socket spaced above its lower end, the slot and socket extending parallel with the longitudinal axis of the body, a detachable carrier for arrangement on the body and including a stem adapted to extend into the socket, an inwardly projecting cutter carrying pin on the carrier, and a lug on the inner portion of the pin for cooperating with the slot, the carrier being positioned by movement longitudinally to insert the stem in the socket and the lug in the slot.

9. A head for a well drill including, a tubular body having a slot in its lower end and a socket spaced above its lower end, the slot and socket extending parallel with the longitudinal axis of the body, a detachable carrier for arrangement on the body and including a stem adapted to extend into the socket, an inwardly projecting cutter carrying pin on the carrier, a rib on the pin for cooperating with the slot, and a weld between the rib and head, the carrier being arranged on the head by movement parallel to the axis of the head to enter the stem in the socket and the rib in the slot.

10. A head for a well drill including, a tubular body having a slot in its lower end and a socket spaced above its lower end, a substantially flat external face on the body, a detachable carrier having a flat face on its inner side cooperating with the said external face of the body, a stem on the carrier extending into the socket, an inwardly projecting pin on the carrier having its inner end bearing on the head, a lug on the inner end of the pin cooperating with the slot, and a rotatable cutter on the pin.

11. In a well tool, a tubular head, a detachable carrier on the head, a pin projecting inwardly from the carrier, the pin being inclined and having its inner end bearing on a surface of the head, a bushing on the pin having an end lying in a plane inclined relative to its longitudinal axis and cooperating with said surface for the transmission of thrusts thereto and to prevent rotation of the bushing, and a rotatable cutter on the bushing.

JOHN H. HOWARD.
ALFRED C. CATLAND.